Oct. 14, 1947.                S. O'NEILL                2,428,985
                     COMBINED COMB AND FLOWER HOLDER
                           Filed Dec. 14, 1944
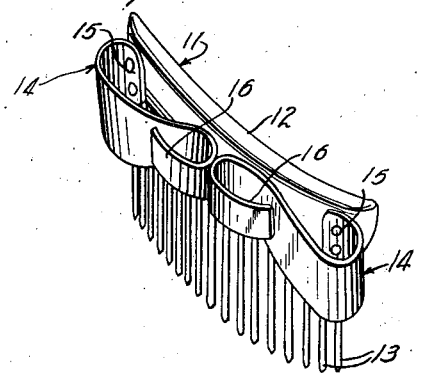
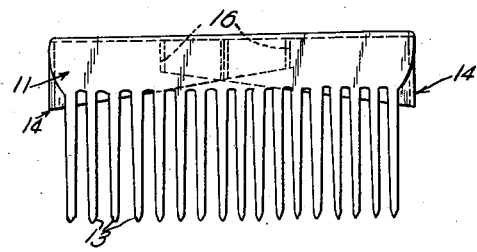
INVENTOR
STANDISH O'NEILL
BY Moses, Nolte, Crews & Berry
ATTORNEYS Patented Oct. 14, 1947

2,428,985

UNITED STATES PATENT OFFICE 2,428,985

COMBINED COMB AND FLOWER HOLDER

Standish O'Neill, New York, N. Y.

Application December 14, 1944, Serial No. 568,117

2 Claims. (Cl. 132—20)

This invention relates to a combined comb and flower holder adapted to be worn in the hair, which is decorative in itself, useful for holding the hair in place, and useful for holding flowers individually or in groups for the purpose of head dress. Reference to the holding of flowers is intended herein to comprehend equivalent service such as the holding of feathers or other hair ornaments of similar character.

It is a further object of the invention to provide a combined comb and flower holder in which the holder is adapted to receive the flowers either before or after the insertion of the comb in the hair.

Other objects and advantages will hereinafter appear.

In the drawing forming part of this specification

Fig. 1 is a perspective view illustrating another embodiment of the invention; and Fig. 2 is a view in rear elevation of the combined comb and flower holder of Fig. 1.

In the form of the invention illustrated in Figs. 1 and 2 a comb 11 comprises a body 12 and teeth 13. The body 11 has united with it adjacent its opposite ends, two resilient clamping arms 14. The outer ends of the arms 14 are fixedly united with the comb body 12 by means of suitable fasteners such as rivets 15, or they may be made integral with the comb body 12. When made separately from the comb body they may be of the same material as the comb or of different materials therefrom, depending upon the style and appearance wanted.

Each of the arms 14 is S-shaped, the inner end portions of the arms being engaged or substantially engaged with the comb body and then with one another and having inner extremities which are curved outward to form finger pieces 16 for easy manipulation by the fingers of the user. The arms 14 may be pulled apart and separated from the comb back 12, and a bouquet of flowers may be inserted. A bouquet, when inserted, is held jointly by the two arms 14 and by the comb back 12.

If desired jewels may be set in the arms 14 to adapt the comb and flower holder for evening wear.

In the form of the invention illustrated, the flowers may be arranged and clamped in the holder either before or after the comb has been applied to the hair, at the choice of the user. This is a matter of considerable advantage, since it enables the user to adapt the procedure to the requirements of each situation encountered.

I have described what I believe to be the best embodiments of my invention. I do not wish, however, to be confined to the embodiments shown, but what I desire to cover by Letters Patent is set forth in the appended claims.

I claim:

1. A combined comb and flower holder comprising, in combination, a comb including a comb body and teeth extending therefrom, and a flower clamp carried by the comb body and cooperative therewith to hold flowers securely in place, said clamp comprising a pair of curved resilient arms having their outer ends united in fixed relation to the comb body and having inner end portions engageable substantially with the comb back and with one another.

2. A combined comb and flower holder comprising, in combination, a comb including a comb body and teeth extending therefrom, and a flower clamp carried by the comb body and cooperative therewith to hold flowers securely in place, said clamp comprising a pair of S-shaped resilient arms having their outer ends turned inward and united in fixed relation to the comb body and having inner end portions engaged substantially with the comb body and then with one another, and then curved outward to form handle portions for the arms.

STANDISH O'NEILL.

REFERENCES CITED

The following references are of record in the file of this patent:

UNITED STATES PATENTS

| Number | Name | Date |
|---|---|---|
| 785,429 | Metcalf | Mar. 21, 1905 |
| 1,050,869 | Stacy | Jan. 21, 1913 |
| 1,786,674 | Perry | Dec. 30, 1930 |

FOREIGN PATENTS

| Number | Country | Date |
|---|---|---|
| 553,512 | France | Feb. 12, 1923 |
| 656,063 | France | Dec. 24, 1928 |